Dec. 23, 1930. F. WILLIAMS 1,785,851
CLAMP TO BE USED IN CONNECTION WITH EMBOSSING MACHINES
Filed Feb. 6, 1929
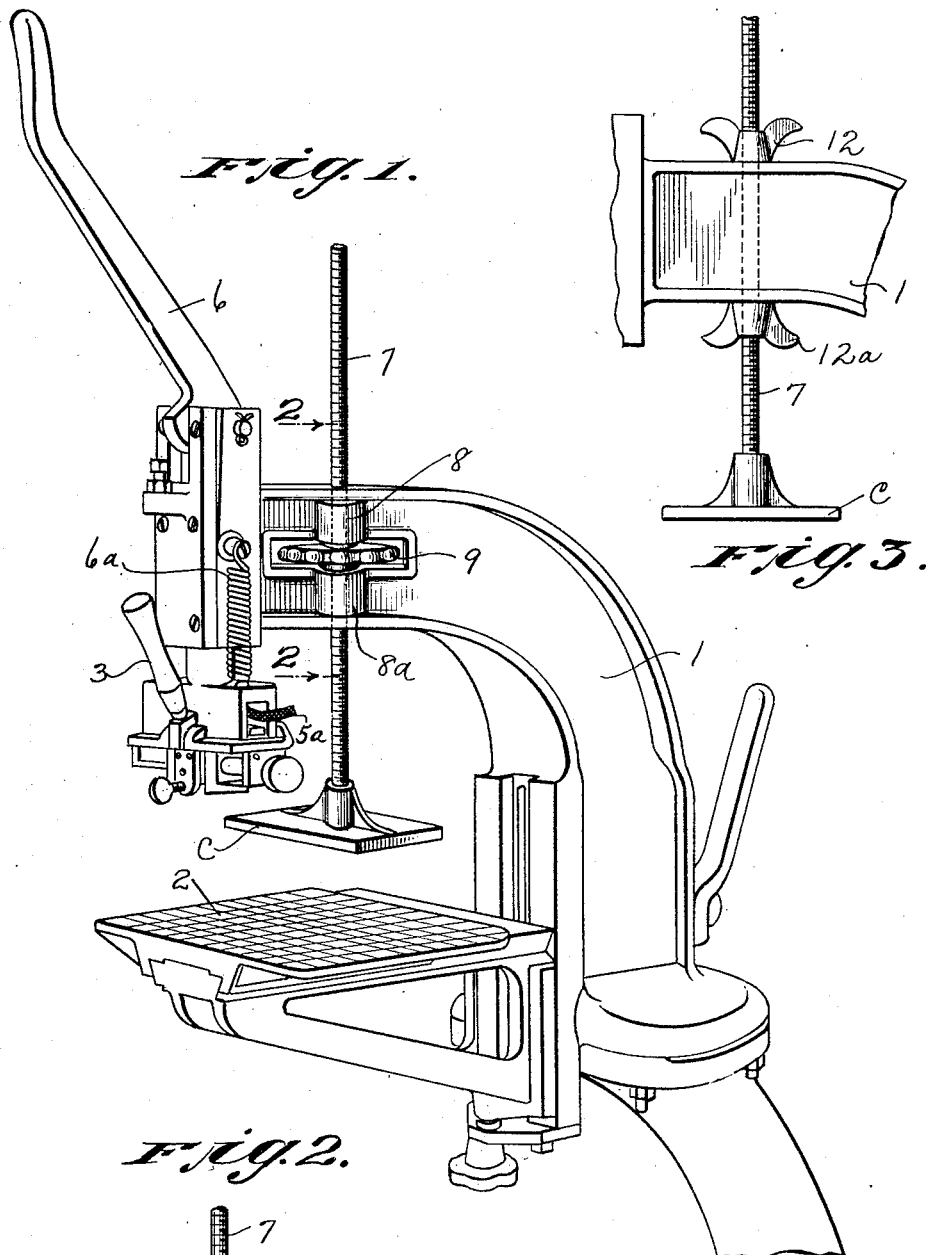
INVENTOR
Frank Williams
BY
Mocke & Blum
ATTORNEYS Patented Dec. 23, 1930

1,785,851

UNITED STATES PATENT OFFICE

FRANK WILLIAMS, OF NEW YORK, N. Y., ASSIGNOR TO SIMPLEX GOLD STAMPING PRESS CO. INC., OF NEW YORK, N. Y., A CORPORATION OF NEW YORK

CLAMP TO BE USED IN CONNECTION WITH EMBOSSING MACHINES

Application filed February 6, 1929. Serial No. 337,795.

My invention relates to a new and improved clamp to be used in connection with embossing machines.

One of the objects of my invention is to provide a new and improved clamp to be used in combination with machines for embossing on leather articles, such as suitcases, or the like, so that the leather article can be conveniently clamped into position, in order to have initials or the like, embossed therein.

Another object of my invention is to provide a clamp which shall be readily adjustable both vertically and horizontally, so that it can be utilized for clamping a large variety of articles into position.

Other objects of my invention will be set forth in the following description and drawings which illustrates a preferred embodiment thereof, it being understood that the above general statement of the objects of my invention is intended merely to generally explain the same and not to limit it in any manner.

Fig. 1 is a perspective view showing one embodiment of my invention.

Fig. 2 is a detail sectional view of the device for raising and lowering the clamp shown in Fig. 1.

Fig. 3 illustrates another embodiment of my invention.

The embossing machine 1 can be of any suitable construction. Since this invention does not relate to the embossing machines per se, it is sufficient to state that it is provided with a table 2 on which the object to be embossed, is to be clamped. The device is also provided with a vertically slidable embossing die having a handle 3 and which is clamped to a vertically slidable frame 4, mounted on a suitable guide 5. An operating handle 6 is provided for moving the member 4 downwardly and a tension spring or springs 6a are provided for normally holding the member 4 (together with the embossing die clamped therein) in the normal position shown in Fig. 1. The embossing die may be heated by means of electric current supplied through a cable 5a. As shown in Fig. 2, the table 2 is provided with a series of markings which indicate the proper position of the suitcase or other object to be embossed.

In the embodiment shown in Figs. 1 and 2, the frame of the machine is provided with a vertical unthreaded opening in which the externally threaded spindle 7 is located. Said spindle 7 passes through enlargements or bushings 8 and 8a. An operating wheel 9 is provided with an internal thread which cooperates with the external thread of the spindle 7. Hence, when the wheel 9 is turned, the spindle 7 is moved upwardly and downwardly. The clamp C is connected to the bottom of the spindle 7. The friction of the spindle 7 in its bearings, is ordinarily sufficient to prevent it from turning when the wheel 9 is turned, so that the clamp C can be moved up or down by merely turning the wheel 9 in the suitable direction. However, the spindle 7 can be freely turned, together with the clamp C, so that the clamp C can be horizontally adjusted in a large number of positions, for clamping various objects into position on the table 2. It will be noted that the clamp C is rectangular, so that its outer contour is non-symmetrical with respect to the axis of spindle 7. Likewise, the clamp C can be freely turned with respect to the frame which supports spindle 7.

In the embodiment shown in Fig. 3, the spindle 7 passes through an opening in the frame of the machine. The spindle 7 is provided with wing-nuts 12 and 12a. The opening in the frame of the machine, through which the spindle 7 passes, is free from an internal thread. Hence, the spindle 7 can be vertically adjusted with respect to the frame of the machine by merely pushing it up and down. Likewise, the spindle 7 can be vertically adjusted by means of the upper wing-nut 12 for example, while the other wing-nut 12a is out of contact with the frame of the machine. The clamp C can be adjusted to the proper vertical position by moving the upper wing-nut 12 into proper position. By then turning the lower wing-nut 12a upon the spindle 7 until the said lower wing-nut 12a is tightly forced against the frame of the machine, the clamp C can be firmly held in proper position.

It is clear that the spindle 7 can be forced downwardly by turning the wing-nut 12a. Hence, it can be forced downwardly with considerable pressure to clamp the object to be embossed, upon the table 2. By then tightening the wing-nut 12, the article is held in this clamped position while the embossing operation is performed. It is also clear that the embodiment shown in Fig. 3 permits the clamp C to be turned in unison with the spindle 7 so that it can occupy any one of a large number of horizontal positions, before it is finally clamped into position.

I have shown a preferred embodiment of my invention, but it is clear that numerous changes and omissions can be made without departing from the spirit of my invention.

I claim:

1. In an embossing machine having a table, a clamp adapted to clamp an object against said table, said clamp being connected to an externally threaded spindle, and nut means located in the frame of the machine and co-operating with said spindle, and adapted to force said clamp upwardly or downwardly, said clamp being non-symmetrical with respect to the axis of said spindle, said clamp being horizontally turnable with respect to said frame.

2. In an embossing machine having a table and a frame, an externally threaded spindle located in an opening of said frame and being turnable with respect to the inner wall of said opening, said spindle having a clamp at the bottom thereof, and nut means associated with the frame and adapted to vertically actuate said spindle, said clamp being non-symmetrical with respect to the axis of said spindle, said clamp being horizontally turnable with respect to said frame.

3. In an embossing machine having a table and a frame, an externally threaded spindle located in an opening of said frame and being turnable with respect to the inner wall of said opening, said spindle having a clamp at the bottom thereof, and nut means associated with the frame and adapted to control the vertical position of said spindle, said nut means comprising a pair of wing-nuts located on opposite sides of the frame of the machine, said clamp being non-symmetrical with respect to the axis of said spindle, said clamp being horizontally turnable with respect to said frame.

In testimony whereof I affix my signature.

FRANK WILLIAMS.